United States Patent
Okada et al.

(10) Patent No.: US 9,469,185 B2
(45) Date of Patent: Oct. 18, 2016

(54) CONTROL DEVICE FOR HYBRID VEHICLE

(75) Inventors: Yuruki Okada, Chiyoda-ku (JP);
Yasuhiko Wada, Chiyoda-ku (JP);
Hisanori Yamasaki, Chiyoda-ku (JP);
Keita Hatanaka, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 72 days.

(21) Appl. No.: 14/415,915

(22) PCT Filed: Jul. 20, 2012

(86) PCT No.: PCT/JP2012/068519
§ 371 (c)(1),
(2), (4) Date: Jan. 20, 2015

(87) PCT Pub. No.: WO2014/013622
PCT Pub. Date: Jan. 23, 2014

(65) Prior Publication Data
US 2015/0174998 A1 Jun. 25, 2015

(51) Int. Cl.
*B60K 6/46* (2007.10)
*B60W 10/26* (2006.01)
(Continued)

(52) U.S. Cl.
CPC .............. *B60K 6/46* (2013.01); *B60L 3/0023* (2013.01); *B60L 3/0046* (2013.01); *B60L 7/14* (2013.01);
(Continued)

(58) Field of Classification Search
CPC ....... B60K 6/46; B60W 20/00; B60W 10/08; B60W 10/26; B60L 3/0023; B60L 3/0046; B60L 7/14; B60L 7/26; B60L 11/123; B60L 11/1861; B60L 15/025; B60L 15/2009; B60L 2240/549; B60L 2210/40; B60L 2240/12; B60L 2240/421; B60L 2240/423; B60L 2240/427; B60L 2240/429; B60L 2240/441; B60L 2240/443; B60L 2240/545; B60L 2240/547; Y02T 10/6217
USPC .................................. 701/22; 180/65.1–65.8
See application file for complete search history.

(56) References Cited

U.S. PATENT DOCUMENTS 5,550,445 A * 8/1996 Nii ........................... B60K 6/46
                                                         180/65.245
5,786,640 A * 7/1998 Sakai ..................... B60K 6/46
                                                         180/65.245

(Continued)

FOREIGN PATENT DOCUMENTS

JP          7-236203 A          9/1995
JP       2000-166009 A          6/2000

(Continued)

OTHER PUBLICATIONS

International Search Report (PCT/ISA/210) mailed on Aug. 21, 2012, by the Japanese Patent Office as the International Searching Authority for International Application No. PCT/JP2012/068519.

(Continued)

*Primary Examiner* — Stephen Holwerda
(74) *Attorney, Agent, or Firm* — Buchanan Ingersoll & Rooney PC

(57) ABSTRACT

A power-generation control unit controls the amount of power a generator can generate, when it is connected to an engine, by controlling a converter that converts AC power output by the generator to DC power. The power-generation control unit calculates a rotational-speed command value $\omega c\_ref1$ for the generator on the basis of a differential voltage value $\Delta Vdc$ between a DC-voltage command value $Vdc\_ref$ for a power storage device and a DC voltage $Vdc$ of a DC link portion; and executes a PWM control on an output of the converter on the basis of this rotational-speed command value $\omega c\_ref1$ such that the rotational speed $\omega c$ of the generator follows the rotational-speed command value $\omega c\_ref1$ and also such that the DC voltage $Vdc$ follows the DC-voltage command value $Vdc\_ref$ so as to prevent overvoltage.

15 Claims, 8 Drawing Sheets

(51) Int. Cl.
- *B60W 20/00* (2016.01)
- *B60W 10/08* (2006.01)
- *B60L 3/00* (2006.01)
- *B60L 7/14* (2006.01)
- *B60L 7/26* (2006.01)
- *B60L 11/12* (2006.01)
- *B60L 11/18* (2006.01)
- *B60L 15/02* (2006.01)
- *B60L 15/20* (2006.01)

(52) U.S. Cl.
CPC ............... *B60L 7/26* (2013.01); *B60L 11/123* (2013.01); *B60L 11/1861* (2013.01); *B60L 15/025* (2013.01); *B60L 15/2009* (2013.01); *B60W 10/08* (2013.01); *B60W 10/26* (2013.01); *B60W 20/00* (2013.01); *B60L 2210/40* (2013.01); *B60L 2240/12* (2013.01); *B60L 2240/421* (2013.01); *B60L 2240/423* (2013.01); *B60L 2240/427* (2013.01); *B60L 2240/429* (2013.01); *B60L 2240/441* (2013.01); *B60L 2240/443* (2013.01); *B60L 2240/545* (2013.01); *B60L 2240/547* (2013.01); *B60L 2240/549* (2013.01); *Y02T 10/6217* (2013.01); *Y02T 10/643* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01)

(56) References Cited

U.S. PATENT DOCUMENTS

| | | | |
|---|---|---|---|
| 5,788,597 A | 8/1998 | Boll et al. | |
| 5,945,808 A * | 8/1999 | Kikuchi | B60K 6/46 320/132 |
| 6,137,250 A * | 10/2000 | Hirano | B60K 6/46 180/65.245 |
| 6,429,613 B2 * | 8/2002 | Yanase | B60K 6/46 180/65.1 |
| 2005/0189894 A1 * | 9/2005 | Komiyama | B60K 6/46 318/376 |
| 2006/0021809 A1 * | 2/2006 | Xu | B60K 6/445 180/65.245 |
| 2006/0052915 A1 * | 3/2006 | Sato | B60W 10/08 701/22 |
| 2009/0243523 A1 * | 10/2009 | Tanaka | B60K 6/445 318/376 |
| 2010/0280694 A1 * | 11/2010 | Noiret | B60L 7/16 701/22 |

FOREIGN PATENT DOCUMENTS

| | | |
|---|---|---|
| JP | 2002-271908 A | 9/2002 |
| JP | 2007-195334 A | 8/2007 |
| JP | 2010-136553 A | 6/2010 |
| JP | 2011-168226 A | 9/2011 |
| JP | 2012-051457 A | 3/2012 |

OTHER PUBLICATIONS

Written Opinion (PCT/ISA/237) mailed on Aug. 21, 2012, by the Japanese Patent Office as the International Searching Authority for International Application No. PCT/JP2012/068519.

Hidehiko Sugimoto et al., "Actual Theory and Design of AC Servo System, From Basic to Software Servo," Sougou Denshi Shuppan, Ltd., (1990), 6 pps.

Extended European Search Report dated Jul. 11, 2016, issued by the European Patent Office in corresponding European Application No. 12881189.0-1953/2875978 (13 pages).

* cited by examiner

CONTROL DEVICE FOR HYBRID VEHICLE

FIELD

The present invention relates to a control device for use in a hybrid vehicle.

BACKGROUND

A hybrid vehicle is a railway vehicle that is configured to use a generator to convert an engine output into electric power and to drive an electric motor using the electric power from the generator and electric power from a power storage device such as a battery so as to control the propulsion of the vehicle.

In the hybrid vehicle configured as described above, which has been disclosed, for example, in Patent Literature 1, a DC-voltage command value for a DC bus is set on the basis of the target output of the battery and the charging rate of the battery, with the output from the battery to the DC bus controlled so as to reach the target output; and when the output from the battery to the DC bus reaches the target output, the output from the generator is controlled such that the DC-voltage level of a converter approaches the DC-voltage command value. The contents of Non Patent Literature 1 mentioned below are described later.

CITATION LIST

Patent Literature

Patent Literature 1: Japanese Patent Application Laid-open No. 2011-168226

Non Patent Literature

Non Patent Literature 1: "Actual Theory and Design of AC Servo System, From Basic to Software Servo", by Hidehiko Sugimoto, Masato Koyama, Shinzo Tamai, p 99-103

SUMMARY

Technical Problem

With the above conventional technique, however, when the railway vehicle runs on a long downward slope for example, regenerated power from a load device is continuously charged to the battery that is a power storage device, and therefore there has been a problem in that the battery may be overcharged and may reach overvoltage.

The present invention has been made to solve the above problems, and an objective of the present invention is to provide a control device for use in a hybrid vehicle that can prevent a power storage device thereof from being overcharged and from reaching overvoltage.

Solution to Problem

To solve the problems and achieve the objective, the present invention relates to a control device for use in a hybrid vehicle that includes: a generator that is driven by an engine; a converter that converts AC power output by the generator to DC power; a power-generation control unit that controls, by controlling the converter, an amount of power generated by the generator; a power storage device that is electrically connected to the converter; and an upper-level control unit that controls at least an operation of the power-generation control unit. The power-generation control unit includes an overvoltage prevention unit that calculates a rotational-speed command value for the generator on the basis of information on a differential voltage value between a DC-voltage command value for an electrical connection end of the power storage device and a DC voltage of the electrical connection end, and that executes a PWM control on an output of the converter on the basis of the rotational-speed command value, such that a rotational speed of the generator follows the rotational-speed command value and also such that the DC voltage follows the DC-voltage command value.

Advantageous Effects of Invention

The present invention can provide a control device for use in a hybrid vehicle that can prevent a power storage device from being overcharged and from reaching overvoltage.

DESCRIPTION OF EMBODIMENTS

Exemplary embodiments of a control device for use in a hybrid vehicle according to the present invention will be described below in detail with reference to the accompanying drawings. The present invention is not limited to the embodiments.

First Embodiment

Figure 1:
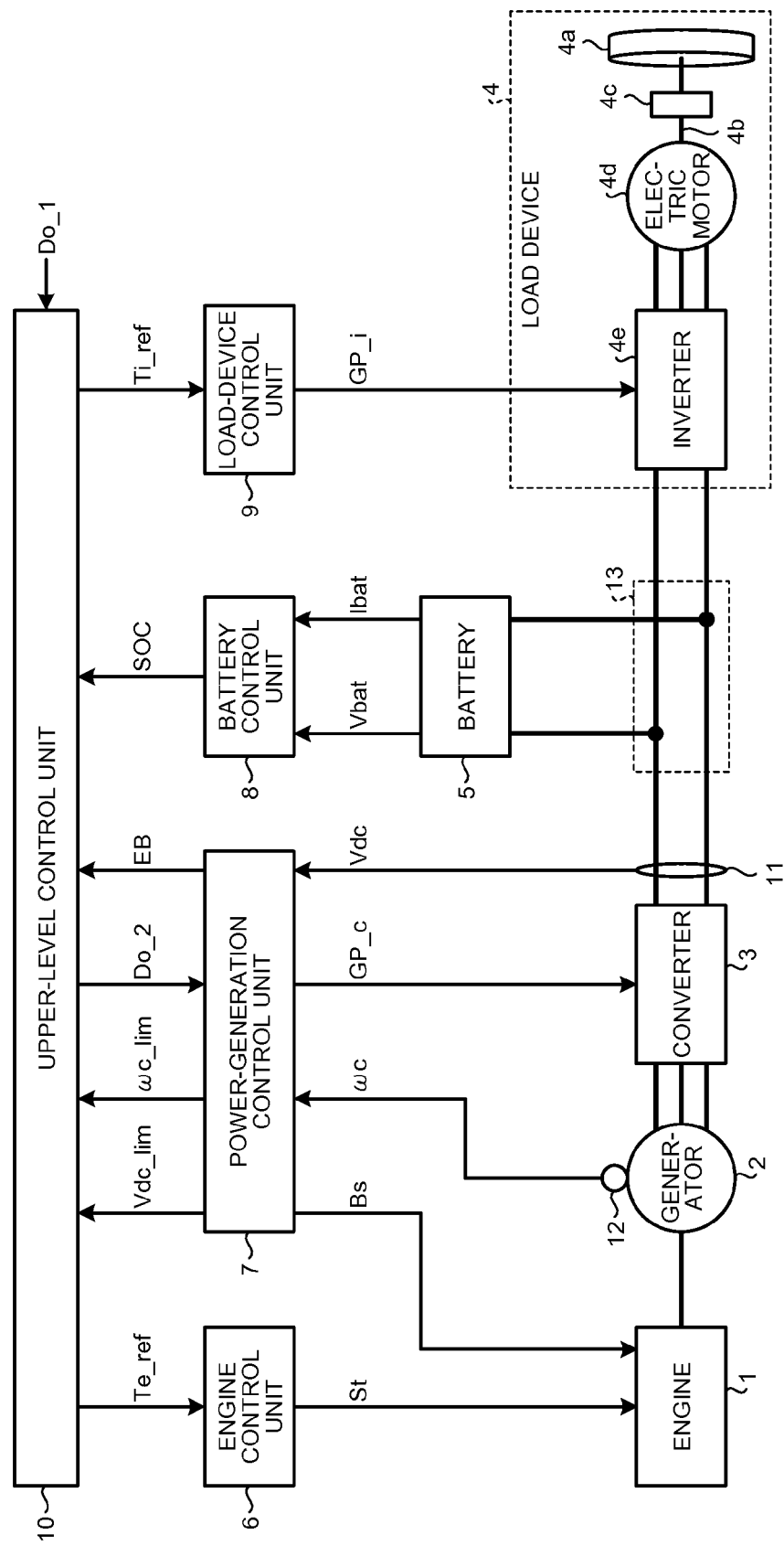
FIG. 1 is a block diagram illustrating an overall configuration of a hybrid vehicle system including a control device for use in a hybrid vehicle according to a first embodiment of the present invention.

FIG. 1 is a block diagram illustrating the overall configuration of a hybrid vehicle system including a control device for use in a hybrid vehicle according to a first embodiment of the present invention. In FIG. 1, the hybrid vehicle system is configured to include an engine 1; a generator 2 that is driven by the engine 1; a converter 3 that functions as a power conversion device; a load device 4 that is connected to the converter 3; a battery 5 that is connected to the converter 3 in the same manner as the load device 4 and that functions as a power storage device; an engine control unit 6 that controls the engine 1; a power-generation control unit 7 that controls the engine 1 and the converter 3 so as to control the power-generation amount of the generator 2; a battery control unit 8 that adjusts the electric power of the battery 5; a load-device control unit 9 that controls the load device 4; and an upper-level control unit 10 that controls the engine control unit 6, the power-generation control unit 7, the battery control unit 8, and the load-device control unit 9 on the basis of a driving command Do_1 from the motorman's cab (not illustrated) and on the basis of various sensor outputs from a voltage sensor 11, a speed sensor 12, and other sensors.

The engine 1 is, for example, a diesel engine and it transmits a drive force to the generator 2 in order to generate power. The engine 1 can be configured to operate an engine brake at the time of a regenerative operation on an electric motor 4d, which is one of the constituent elements of the load device 4. It can also be configured to operate what is called an exhaust brake (an assisted engine brake) that reduces the rotational speed of the engine 1 by closing a valve provided at a location within an exhaust pipe so as to increase the exhaust pressure, which thereby increases the pumping loss of the engine 1. Further, the engine 1 can be configured to switch between the engine brake and the exhaust brake by executing an ON/OFF control on the exhaust valve.

The generator 2 is, for example, a three-phase AC generator and it functions as a power supply source that generates electric power by rotating a rotor driven by the drive force of the engine 1 and that supplies the generated electric power (AC power) to at least one of the load device 4 and the battery 5. The generator 2 can also operate as an electric motor and can consume electric power when cranking the engine 1 to start the engine 1, or by rotating the engine 1 by using the drive force of the generator 2.

The converter 3 functions as a power conversion device and is configured to include a plurality of switching elements and rectifying elements (both not illustrated); is connected between the generator 2 and a DC link portion 13 to which both the battery 5 and the load device 4 are electrically connected; and converts AC power generated by the generator 2 into DC power in accordance with a gate signal Gp_c from the power-generation control unit 7 described later. When the generator 2 is operated as an electric motor, the converter 3 performs a reverse conversion operation to convert DC power supplied from the battery 5 or the load device 4 into AC power.

As illustrated in FIG. 1, the load device 4 connected to the DC link portion 13 is configured to include a drive wheel 4a, an axle 4b, an inverter 4e that functions as a power conversion device in the load device 4, the electric motor 4d that drives a vehicle, and a speed reducer 4c that reduces the speed of the output from the electric motor 4d and transmits the output, of which the speed is reduced, to the axle 4b. The inverter 4e is configured to include a plurality of switching elements and rectifying elements (both not illustrated) and converts DC power, which is supplied from at least one of the battery 5 and the converter 3, to AC power so as to supply the AC power to the electric motor 4d. When the electric motor 4d in the load device 4 performs a regenerative operation, the inverter 4e is capable of performing a reverse conversion operation to convert AC power regenerated by the electric motor 4d into DC power. The electric motor 4d in the load device 4 is, for example, a three-phase AC electric motor, and it generates and transmits a drive force to the drive wheel 4a via the speed reducer 4c. The electric motor 4d can also operate as a generator. When the speed of a vehicle is reduced, the electric motor 4d generates regenerated power by being driven by the drive wheel 4a so as to regenerate power from the vehicle's kinetic energy.

The battery 5 that is connected to the DC link portion 13 in the same manner as the load device 4 is, for example, a lithium-ion secondary battery. While being charged with the output power by the generator 2 or with regenerated power by the electric motor 4d, the battery 5 supplies drive power for driving the generator 2 and the electric motor 4d to the DC link portion 13.

The engine control unit 6 controls a throttle opening St of the engine 1 in accordance with an engine-torque command value Te_ref from the upper-level control unit 10 and on the basis of a signal dependent on the engine rotational speed or the like detected by a sensor (not illustrated) with which the engine 1 is provided, the engine control unit 6 controls the engine 1 such that the engine 1 generates a torque that corresponds to the engine-torque command value Te_ref.

The power-generation control unit 7 controls the voltage supplied to the generator 2 by controlling the switching of the switching elements that constitute the converter 3 according to a rotational speed $\omega c$ of the generator 2, which is detected by the speed sensor 12 mounted on the generator 2, and according to the condition of a DC voltage value Vdc, which is detected by the voltage sensor 11 with which the DC link portion 13 is provided. The power-generation control unit 7 transmits the controlling conditions to the upper-level control unit 10.

The battery control unit 8 estimates the state of charge (SOC) of the battery 5 on the basis of a battery current value Ibat that is the charge current or discharge current of the battery 5, which is detected by a current sensor (not illustrated) of the battery 5, and also on the basis of a battery voltage value Vbat, which is detected by a voltage sensor (not illustrated) of the battery 5. The battery control unit 8 outputs the estimated SOC to the upper-level control unit 10. The battery current value Ibat and the battery voltage value Vbat can be detected by a current sensor and a voltage sensor with which the DC link portion 13 is provided, and the values detected thereby can be input into the battery control unit 8.

The load-device control unit 9 generates a gate signal GP_i, which is what is called a PWM switching signal, for controlling the inverter 4e such that the torque of the electric motor 4d follows an electric-motor torque command value Ti_ref from the upper-level control unit 10. The load-device control unit 9 outputs this generated gate signal GP_i to the load device 4 in order to control the inverter 4e.

The function of the upper-level control unit 10 is to manage and monitor all of the operations of each of the constituent elements previously described. More specifically, the upper-level control unit 10 controls the generator 2 via the power-generation control unit 7 and the converter 3 on the basis of the rotating speed $\omega c$ of the generator 2, information on the DC voltage Vdc obtained by the voltage sensor 11 of the DC link portion 13, and a control command Do_2 generated on the basis of the driving command Do_1 that is input thereto. Also, the upper-level control unit 10 controls the engine 1 via the engine control unit 6. Further, the upper-level control unit 10 controls the engine 1 via the engine control unit 6 on the basis of an engine brake signal EB from the power-generation control unit 7, monitors the limitation signal from the power-generation control unit 7, and notifies the motorman's cab (not illustrated) of necessary information.

In the device configuration described above, in order to solve the problem in which, when an engine brake is used during power regeneration in the load device 4, the engine 1 rotates at a higher speed due to regenerated power from the load device 4 and also the battery 5 reaches its overvoltage, the following generator control is executed to prevent the battery 5 from being overcharged and from reaching its overvoltage while at the same time preventing the engine 1 from over-speeding.

Figure 2:
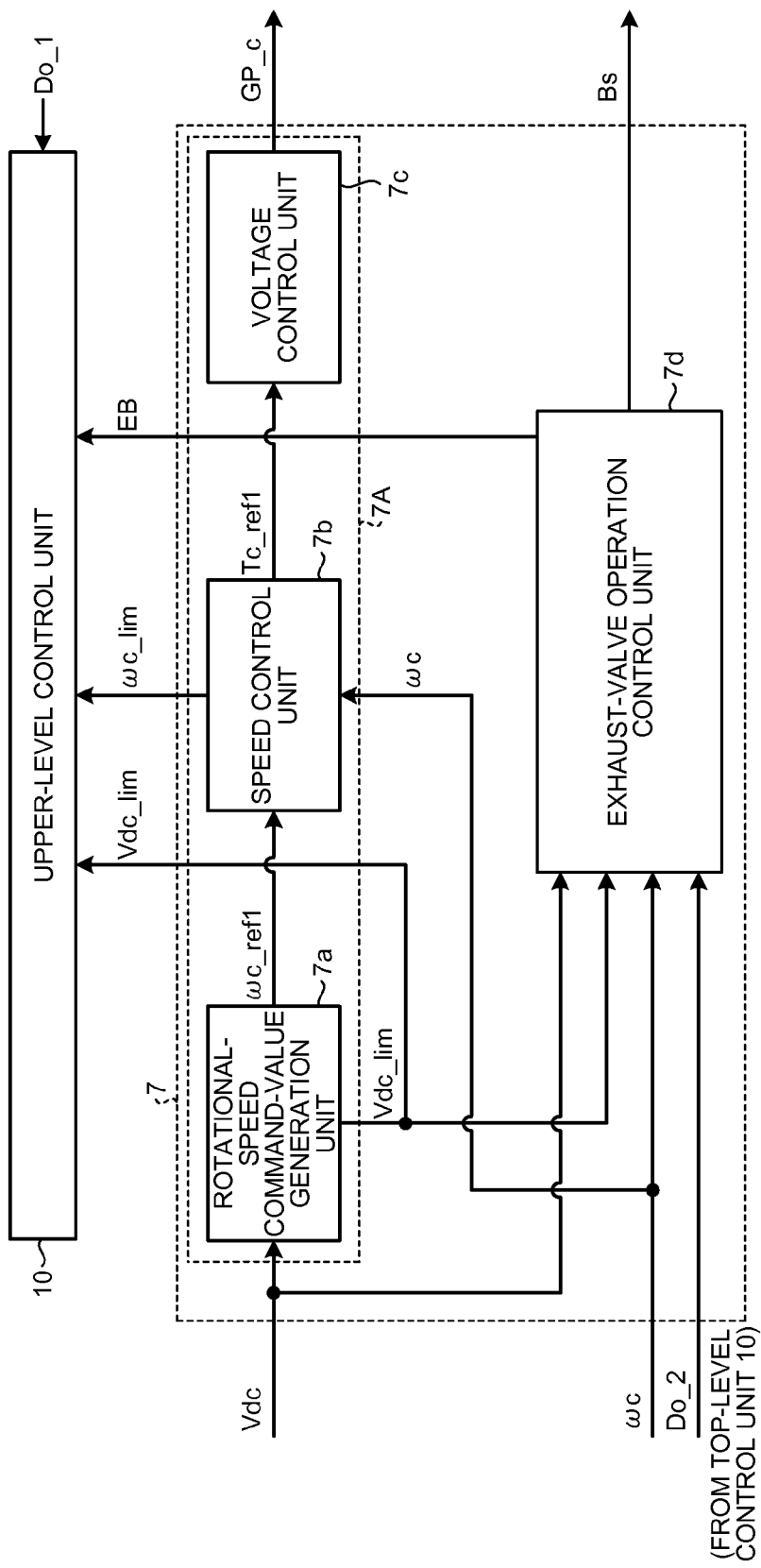
FIG. 2 is a block diagram illustrating a configuration of a power-generation control unit that constitutes the main component of a control device for use in a hybrid vehicle according to the first embodiment of the present invention.

FIG. 2 is a block diagram illustrating a configuration of the power-generation control unit 7 that constitutes the main component of the control device for use in a hybrid vehicle according to the first embodiment of the present invention. In FIG. 2, the power-generation control unit 7 is configured such that it includes a rotational-speed command-value generation unit 7a, a speed control unit 7b, a voltage control unit 7c, and an exhaust-valve operation control unit 7d. The rotational-speed command-value generation unit 7a, the speed control unit 7b, and the voltage control unit 7c, detailed operations of which will be described later, execute control of the rotational speed of the generator 2 so as to follow the rotational-speed command value of the generator 2 and execute control of the DC voltage of the DC link portion 13 so as to follow a DC-voltage command value for the DC link portion 13, thus operating as an overvoltage prevention unit 7A that prevents overvoltage. Note that the overvoltage prevention unit 7A can include the exhaust-valve operation control unit 7d as a constituent element.

Figure 3:
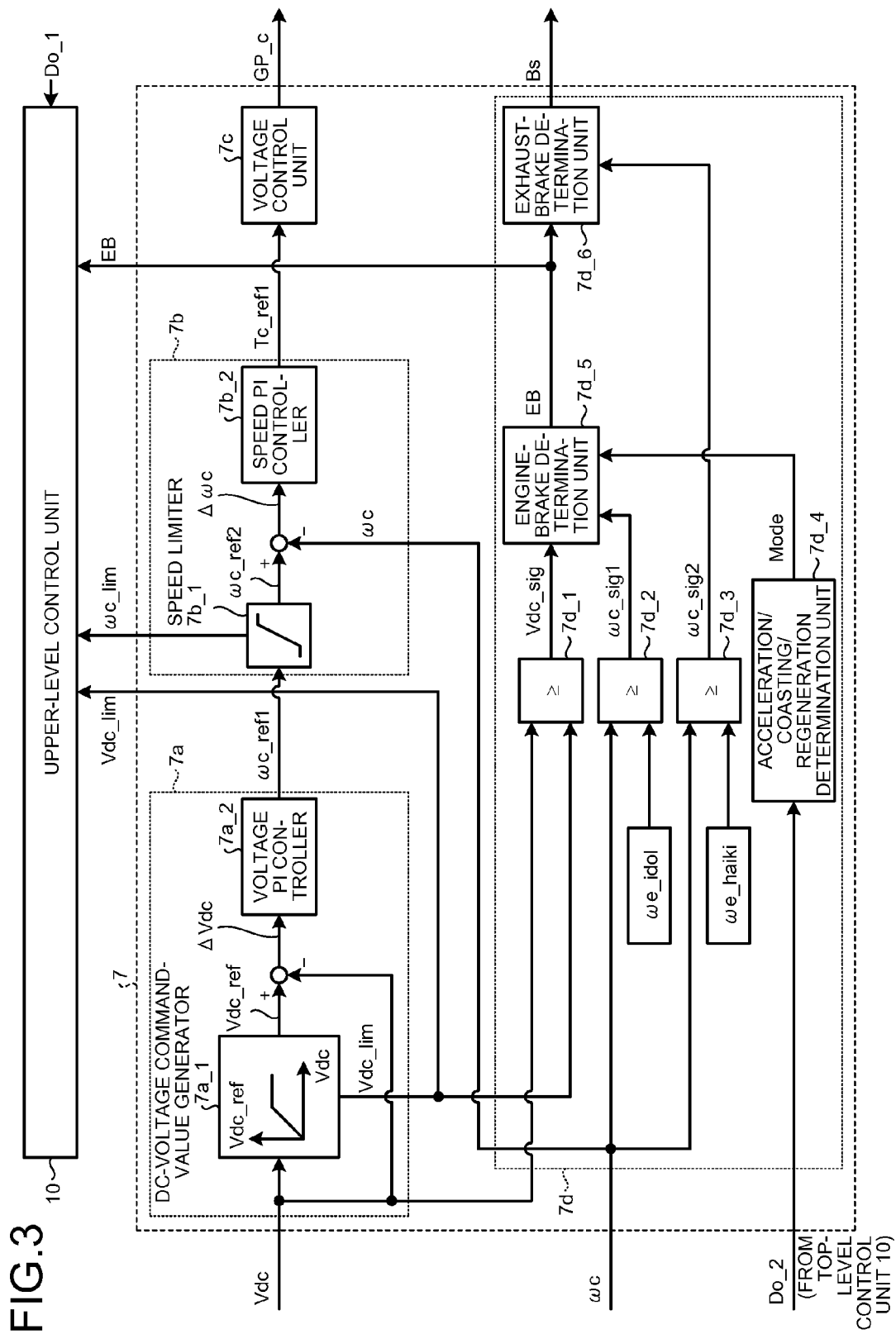
FIG. 3 is a block diagram illustrating a more detailed configuration of the power-generation control unit illustrated in FIG. 2.

FIG. 3 is a block diagram illustrating a more detailed configuration of the power-generation control unit 7 illustrated in FIG. 2. As illustrated in FIG. 3, the rotational-speed command-value generation unit 7a is configured to include a DC-voltage command-value generator 7a_1, a voltage PI controller 7a_2, and other devices. The DC-voltage command-value generator 7a_1 generates a DC-voltage command value Vdc_ref. On the basis of a differential voltage value between the generated DC-voltage command value Vdc_ref and the DC voltage Vdc, the voltage PI controller 7a_2 calculates a rotational-speed command value ωc_ref1.

Figure 4:
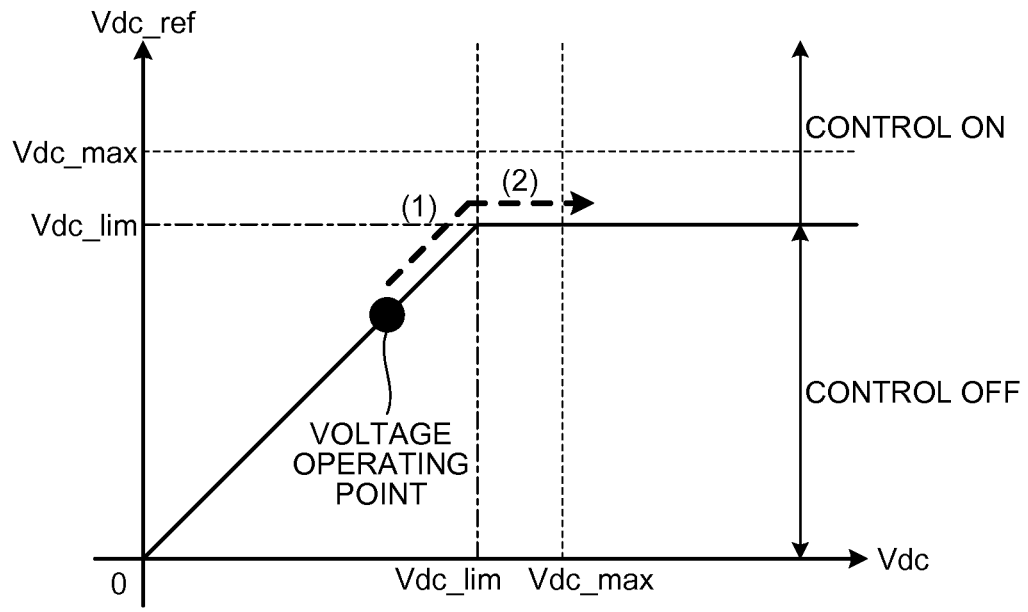
FIG. 4 is a graph illustrating input and output characteristics of a DC-voltage command-value generator.

A more detailed operation of the DC-voltage command-value generator 7a_1 is described below with reference to FIG. 4. FIG. 4 is a graph illustrating input and output characteristics of the DC-voltage command-value generator 7a_1, in which the horizontal axis represents the DC voltage Vdc, and the vertical axis represents the DC-voltage command value Vdc_ref. An overvoltage limit voltage Vdc_max and an overvoltage threshold value Vdc_lim are set on the horizontal axis and the vertical axis in FIG. 4, respectively. The overvoltage limit voltage Vdc_max is the voltage value of the battery 5 when the state of charge (SOC) of the battery 5 is full (SOC=100%), for example. The overvoltage threshold value Vdc_lim is a voltage value that is set within a range where it does not exceed the overvoltage limit value Vdc_max when the electric motor 4d in the load device 4 performs a regenerative operation. The DC-voltage command-value generator 7a_1 generates the DC-voltage command value Vdc_ref according to the DC voltage Vdc. However, when the DC voltage Vdc becomes equal to or higher than the overvoltage threshold value Vdc_lim, excess regenerated power due to the engine brake is consumed. Therefore, in a case in which the electric motor 4d in the load device 4 performs a regenerative operation, the DC-voltage command value Vdc_ref is determined as follows.

Interval (1) (the voltage on the horizontal axis is between 0 and the overvoltage threshold value Vdc_lim)

In this interval, the DC-voltage command-value generator 7a_1 outputs the DC-voltage command value Vdc_ref that corresponds with the DC voltage Vdc.

Interval (2) (the voltage on the horizontal axis is equal to or higher than the overvoltage threshold value Vdc_lim)

In this interval, the DC-voltage command-value generator 7a_1 outputs the DC-voltage command value Vdc_ref that is equal to the overvoltage threshold value Vdc_lim regardless of the DC voltage Vdc.

As described above, when the value of the DC voltage Vdc falls within the interval (2), the DC-voltage command-value generator 7a_1 determines that the battery 5 is in a slight overvoltage state; therefore, it starts an engine brake control and then generates and outputs a command value for consuming regenerated power from the load device 4 for a rotational friction force of the engine 1.

Further, the DC-voltage command-value generator 7a_1 transmits information on the overvoltage threshold value Vdc_lim to the exhaust-valve operation control unit, 7d described later, and to the upper-level control unit 10. The overvoltage threshold value Vdc_lim can be calculated and set within a range in which it does not exceed the overvoltage limit voltage Vdc_max and for each train line in advance on the basis of the maximum regenerated power of inverter power flowing from the inverter 4e to the DC link portion 13. The overvoltage threshold value Vdc_lim transmitted to the upper-level control unit 10 is stored in the upper-level control unit 10 for each elapsed time.

This section refers back to FIG. 3. A differential voltage value ΔVdc between the DC voltage Vdc and the DC-voltage command value Vdc_ref, generated by the DC-voltage command-value generator 7a1, is input to the voltage PI controller 7a_2. The voltage PI controller 7a_2 uses a gain that is set in advance on the basis of a desired voltage control response and performs a proportional-integral calculation, for example, on the differential voltage value ΔVdc so as to calculate and output the rotational-speed command value ωc_ref1. The calculated rotational-speed command value ωc_ref1 is input to the speed control unit 7b arranged at the subsequent stage.

Next, the speed control unit 7b will be described. As illustrated in FIG. 3, the speed control unit 7b is configured to include a speed limiter 7b_1, a speed PI controller 7b_2, and the like. The speed limiter 7b_1 limits the rotational-speed command value ωc_ref1 from the rotational-speed command-value generation unit 7a. Being on the basis of a differential rotating speed between this limited output value and a generator rotating speed (which is synonymous with a generator rotational speed) ωc, the speed PI controller 7b_2 generates a torque command value Tc_ref1 for the generator 2.

Figure 5:
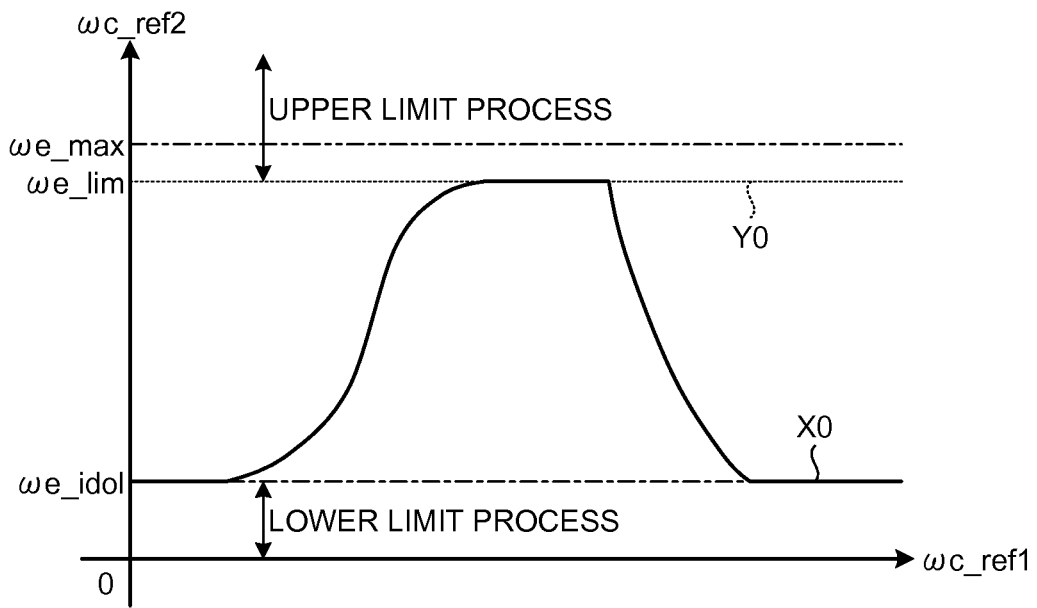
FIG. 5 is a graph illustrating input and output characteristics of a speed limiter.

A more detailed operation of the speed limiter 7b 1 is described below with reference to FIG. 5. FIG. 5 is a graph illustrating input and output characteristics of the speed limiter 7b1. The speed limiter 7b_1 performs at least one of an upper limit processing and a lower limit processing on the rotational-speed command value ωc_ref1 (a first rotational-speed command value) that is output from the voltage PI controller 7a_2 so as to output the result as a rotational-speed command value ωc_ref2 (a second rotational-speed command value).

For example, a limit value (a lower-limit value) used for the lower limit processing is defined as an idling rotating speed ωe_idol (=X0) of the engine 1 and is to prevent the rotational-speed command value ωc_ref2 from becoming equal to or lower than the idling rotating speed ωe_idol. A limit value (an upper-limit value) used for the upper limit processing is defined as an engine rotating speed ωe_lim (=Y0) that is set by taking into consideration the estimated margin to a maximum rotating speed ωe_max when an engine brake and an exhaust brake of the engine 1 are operated so as to prevent the rotational-speed command value ωc_ref2 from becoming equal to or higher than the engine rotating speed ωe_lim. In addition, the speed limiter 7b_1 transmits information on the rotational-speed command value ωc_ref2, on the basis of which the limit processing has been performed, to the upper-level control unit 10 as a generator limit signal ωc_lim.

Referring back to FIG. 3, a differential rotational-speed value Δωc, which is a value between the rotational-speed command value ωc_ref2 output from the speed limiter 7b_1 and the generator rotational speed ωc obtained from a rotor shaft of the generator 2, is input to the speed PI controller 7b2. The speed PI controller 7b_2 uses a gain that is set in advance on the basis of a desired speed control response to perform a proportional-integral calculation, for example, on the differential rotational-speed value Δωc so as to calculate and output the torque command value Tc_ref1. The calculated torque command value Tc_ref1 is input to the voltage control unit 7c arranged at the subsequent stage.

Next, the voltage control unit 7c will be described. In FIG. 3, the voltage control unit 7c calculates a voltage command value to be output to the converter 3 on the basis of a control (a so-called vector control) for causing the output torque of the generator 2 to follow the torque command value Tc_ref1 input from the speed PI controller 7b_2. The voltage control unit 7c generates a gate signal GP_c for executing a PWM control on the converter 3 on the basis of this calculated voltage command value and outputs the results to the converter 3. The PWM control is executed on the converter 3 by a PWM control device (not illustrated) on the basis of the gate signal GP_c from the voltage control unit 7c. The converter 3 controls the output torque of the generator 2. The torque control technique using the vector control is a publicly-known one and it is referred to, for example, in Non Patent Literature 1 mentioned above.

Next, the exhaust-valve operation control unit 7d will be described. As illustrated in FIG. 3, the exhaust-valve operation control unit 7d is configured to include comparators 7d_1 to 7d_3, an acceleration/coasting/regeneration determination unit 7d_4, an engine-brake determination unit 7d_5, an exhaust-brake determination unit 7d_6, and other devices.

The comparator 7d_1 compares the DC voltage Vdc of the DC link portion 13 with the overvoltage threshold value Vdc_lim generated by the rotational-speed command-value generation unit 7a. When the DC voltage Vdc exceeds the overvoltage threshold value Vdc_lim, the comparator 7d_1 outputs an ON signal as a signal Vdc_sig to the engine-brake determination unit 7d_5. Note that the overvoltage threshold value Vdc_lim is decided within a range where the battery 5 does not reach overvoltage when the electric motor 4d in the load device 4 performs a regenerative operation as described previously.

The comparator 7d_2 compares the generator rotating speed ωc with the idling rotating speed ωc_idol of the engine 1. When the generator rotating speed ωc exceeds the idling rotating speed ωe_idol, the comparator 7d_2 outputs an ON signal of a signal ωc_sig1 to the engine-brake determination unit 7d_5.

Figure 8:
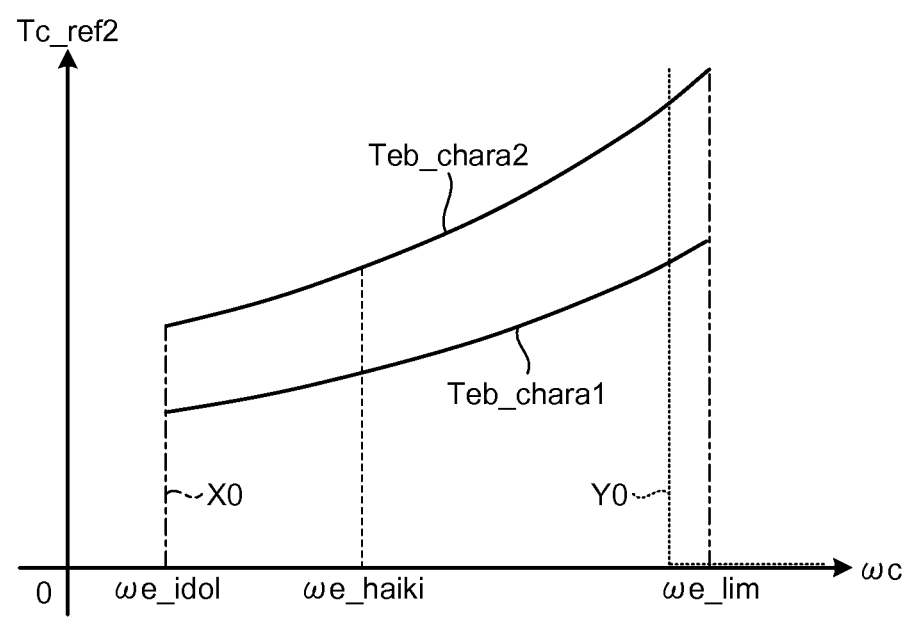
FIG. 8 is a graph illustrating input and output characteristics of a torque corrector.

The comparator 7d_3 compares the generator rotating speed ωc with an engine rotating speed ωe_haiki when the exhaust brake of the engine 1 operates. When the generator rotating speed ωc exceeds the engine rotating speed ωe_haiki, the comparator 7d_3 outputs an ON signal of a signal ωc_sig2 to the exhaust-brake determination unit 7d_6. The engine rotating speed ωe_haiki during the operation of an exhaust brake is a rotating speed with a value between the idling rotating speed ωe_idol and the allowable maximum rotating speed ωe_lim of the engine 1, as illustrated in FIG. 8 and which is described later. For example, when the idling rotating speed ωe_idol is around 600 rpm and the allowable maximum rotating speed ωe_lim is 2000 rpm, then the engine rotating speed ωe_haiki is around 1200 rpm when an exhaust brake operates.

The acceleration/coasting/regeneration determination unit 7d_4 receives a driving operation signal Do_2 from the upper-level control unit 10, and it outputs this information to the engine-brake determination unit 7d_5 as a mode (acceleration/coasting/regeneration) signal.

The engine-brake determination unit 7d_5 determines whether it is possible to operate an engine brake on the basis of three signals: the signal Vdc_sig from the comparator 7d_1; the mode signal from the acceleration/coasting/regeneration determination unit 7d_4; and the signal ωc_sig1 from the comparator 7d_2. The engine-brake determination unit 7d_5 then outputs the engine-brake signal EB to the exhaust-brake determination unit 7d_6 and to the upper-level control unit 10. When the signal Vdc_sig is ON, the mode signal indicates regeneration, and when the signal ωc_sig1 is ON, an ON signal as an engine-brake signal EB is output to the exhaust-brake determination unit 7d_6 and to the upper-level control unit 10. In a case other than this combination described above that results in the ON signal, an OFF signal as an engine-brake signal EB is output to the exhaust-brake determination unit 7d_6 and to the upper-level control unit 10.

The exhaust-brake determination unit 7d_6 determines whether it is possible to operate an exhaust brake on the basis of two signals that are the engine-brake signal EB from the engine-brake determination unit 7d_5 and the signal ωc_sig2 from the comparator 7d_3, and then it outputs a valve operation signal Bs. An ON signal as the valve operation signal Bs is output when the engine-brake signal EB is ON and the signal ωc_sig2 is ON. In a case other than this combination that results in this ON signal, an OFF signal as the valve operation signal Bs is output.

The control sequence of the power-generation control unit 7 is as described above. Due to this control sequence, the upper-level control unit 10 performs the following operation when an engine brake is operated so as to prevent the battery 5 from reaching overvoltage.

(Control to be Executed on Engine Control Unit 6)

When the DC voltage Vdc becomes equal to or higher than the overvoltage threshold value Vdc_lim during the regenerative operation in the electric motor 4d, and when the generator rotating speed ωc becomes equal to or higher than the idling rotating speed, then an ON signal as an engine brake signal EB is output to the upper-level control unit 10. At this time, the upper-level control unit 10 outputs an engine torque command Te_ref (see FIG. 1) that is equal to "0 (zero)" to the engine control unit 6. The engine control unit 6, to which the engine torque command Te_ref that is equal to 0 has been output, transmits to the engine 1 a command to close the throttle opening St (see FIG. 1) of the engine 1 so as to stop the fuel supply to the engine 1. Thereafter, the regenerated power from the load device 4 is not used to charge the battery 5, but is consumed by the friction load of the engine 1, thus preventing the battery 5 from reaching overvoltage.

(Control to be Executed on Load-Device Control Unit 9)

While executing the control described above, the upper-level control unit 10 decreases a load-torque command value Ti_ref (see FIG. 1) from the load-device control unit 9 so as to reduce regenerated power from the load device 4 in accordance with the generator limit signal ωc_lim from the speed limiter 7b_1. According to the amount by which the load-torque command value Ti_ref is decreased, the mechanical brake force is increased to consume excess regenerated power with a mechanical brake. The generator limit signal ωc_lim is sent to the motorman's cab (not illustrated) and the like via the upper-level control unit 10, and the motorman is informed via an indicator lamp or other means.

As described above, in the control device for use in a hybrid vehicle according to the first embodiment, when the DC voltage Vdc becomes equal to or higher than the overvoltage threshold value Vdc_lim, the power-generation control unit 7 executes a control in which the differential voltage ΔVdc between the DC voltage Vdc and the DC-voltage command value Vdc_ref is first output as the rotational-speed command value ωc_ref1, and further the upper/lower limit processing is performed on the rotational-speed command value ωc_ref1 in the speed limiter 7b_1 so as to output a generator rotating speed ωc_ref2. By executing this control, excessive regenerated power can be consumed by an engine brake or an exhaust brake, and overcharge and overvoltage can be prevented, while reducing engine overspeed.

Note that it is preferable that the DC-voltage command-value generator 7a_1 in the power-generation control unit 7 sets, in the load device 4, the overvoltage threshold value Vdc_lim in consideration of the voltage decrease in the battery 5 during the maximum power regeneration. By taking into account this point, the internal resistance of the battery 5 can reliably prevent the DC voltage Vdc from increasing and thus from falling within the overvoltage area.

A closed-loop speed control system, on which the upper/lower limit processing has been performed by the speed limiter 7b_1, is provided on the input side of a voltage control system. This can reliably prevent the engine 1 from rotating at an abnormal speed. Specifically, even when the DC voltage Vdc is significantly changed by a voltage decrease caused by the internal resistance of the battery 5, the speed limiter 7b_1 in the speed control system can prevent the mechanical system constituted by the generator 2 and the engine 1 from rotating at an abnormal speed. It is more preferable to take into account the maximum value of a current that can be absorbed by the battery 5 (maximum absorbed current) in addition to the internal resistance of the battery 5.

It is preferable to set the lower-limit value X0 of the generator rotational speed in the speed limiter 7b_1 to the idling speed ωe_idol of the engine 1 or higher. With the setting as described above, the rotational-speed command value ωc_ref2 in the power-generation control unit 7 is controlled so as not to fall below the idling speed ωe_idol. Therefore, the engine 1 can be prevented from rotating in the reverse direction and accordingly can continue a stable operation.

It is preferable that the speed limiter 7b_1 provides the upper-limit value Y0 of the generator rotational speed with a margin to the allowable maximum rotating speed ωe_max while an engine brake and an exhaust brake of the engine 1 are being operated, so the upper-limit value Y0 is preferably set to a value slightly smaller than the allowable maximum rotating speed ωe_max. Due to such a setting as that described above being set, the engine 1 can be reliably prevented from rotating at a high speed, and thus from being mechanically damaged.

It is preferable to transmit the generator limit signal ωc_lim in the speed limiter 7b_1 to the upper-level control unit 10. This limitation information can be sent from the upper-level control unit 10 via a motorman's cab to the motorman, and therefore the motorman can recognize the fact that the DC-voltage command value Vdc_ref is being generated in a restricted manner.

By transmitting the generator limit signal ωc_lim to the upper-level control unit 10, the upper-level control unit 10 can reduce regenerated power from the load device 4. Therefore, the period of time, during which the battery 5 is nearly in a state of overvoltage, is reduced, thereby lessening the degradation of the battery 5.

Second Embodiment

Figure 6:
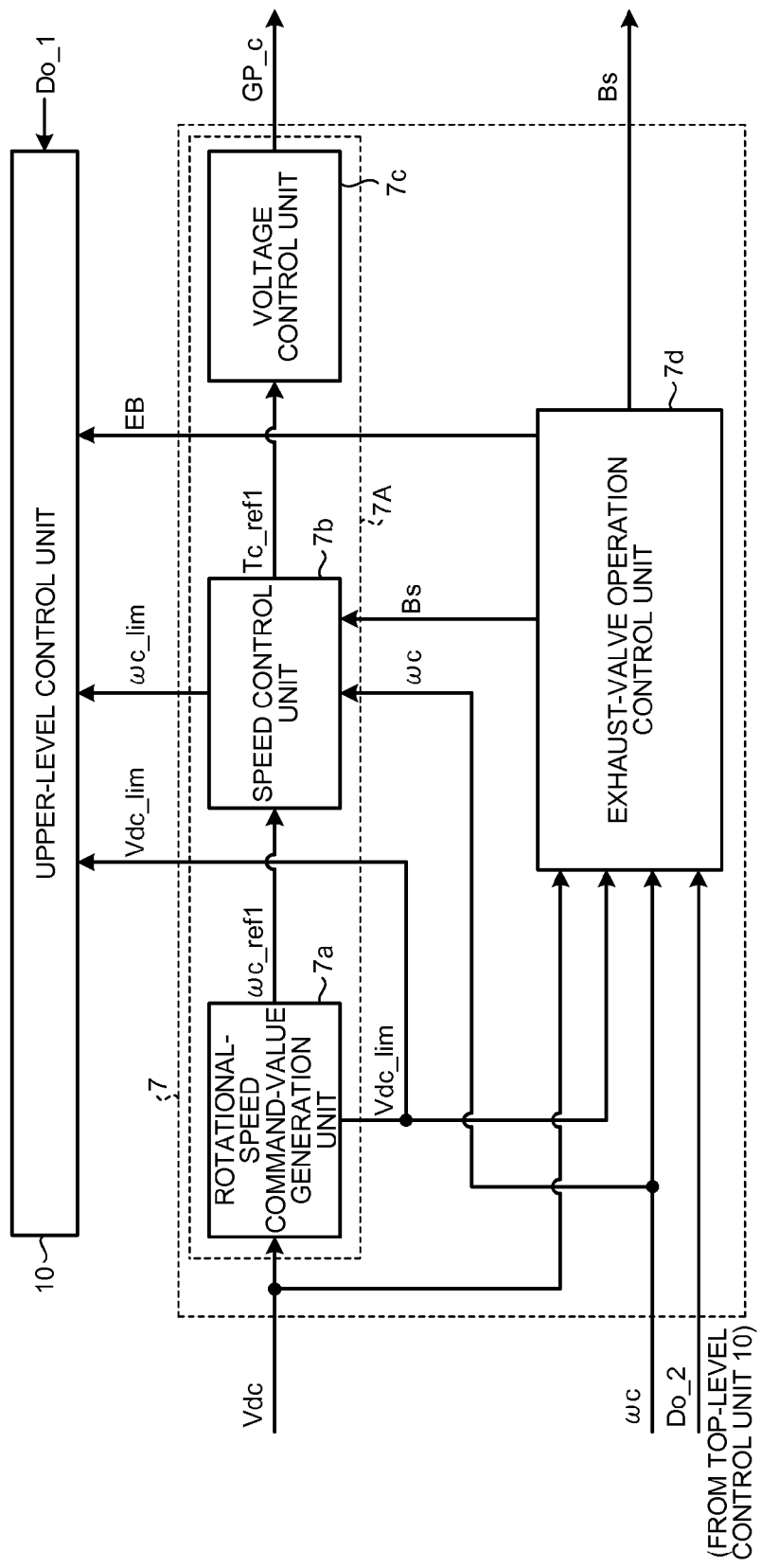
FIG. 6 is a block diagram illustrating a configuration of a power-generation control unit that constitutes the main component of a control device for use in a hybrid vehicle according to a second embodiment of the present invention.

Next, a control device for use in a hybrid vehicle according to a second embodiment of the present invention will be described. FIG. 6 is a block diagram illustrating a configuration of the power-generation control unit 7 that constitutes the main component of the control device for use in a hybrid vehicle according to the second embodiment of the present invention. The second embodiment differs when compared with the power-generation control unit 7 in the first embodiment in that the valve operation signal Bs is transmitted from the exhaust-valve operation control unit 7d to the speed control unit 7b and in what the speed control unit 7b internally processes.

Figure 7:
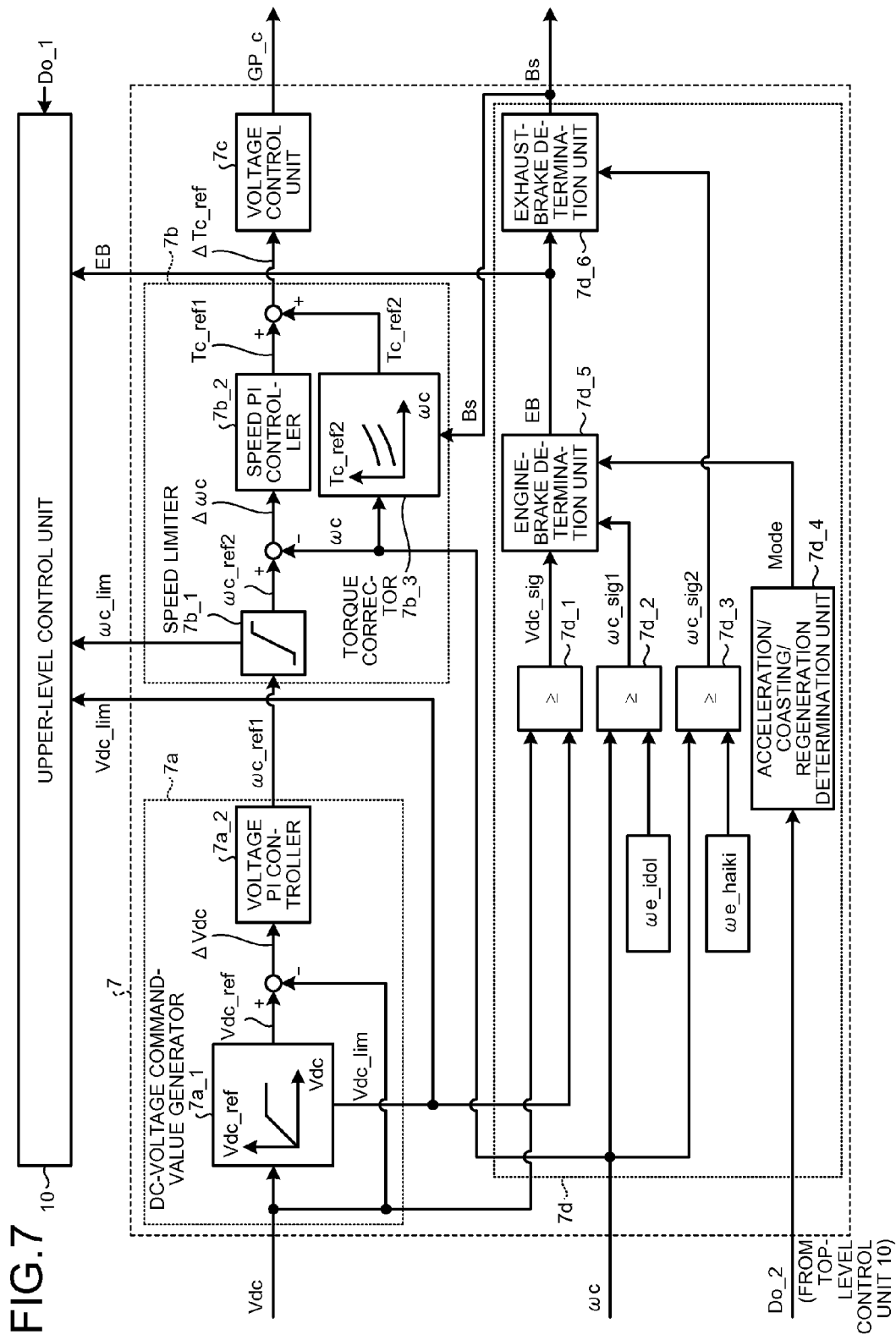
FIG. 7 is a block diagram illustrating a more detailed configuration of the power-generation control unit illustrated in FIG. 6.

FIG. 7 is a block diagram illustrating a more detailed configuration of the power-generation control unit 7 illustrated in FIG. 6. In the second embodiment, when compared with the speed control unit 7b in the first embodiment, a torque corrector 7b_3 is newly provided. The speed control unit 7b in the second embodiment calculates a differential torque command value ΔTc_ref between the torque command value Tc_ref1, calculated by the speed PI controller 7b_2, and a torque correction value Tc_ref2, obtained by referring to a map in the torque corrector 7b_3 on the basis of the generator rotating speed ωc and the valve operation signal Bs. The calculated value is output to the voltage control unit 7c.

Here, a more detailed operation of the newly-provided torque corrector 7b_3 with reference to FIG. 8 is given. FIG. 8 is a graph illustrating input and output characteristics of the torque corrector 7b_3, in which the horizontal axis represents the rotational speed ωc of the generator 2 and the vertical axis represents the torque correction value Tc_ref2 that is output from the torque corrector 7b_3.

As illustrated in FIG. 8, in the map to which the torque corrector 7b_3 refers, each of a friction-torque command characteristic Teb_chara1 during operation of an engine brake for the engine 1 and a friction-torque command characteristic Teb_chara2 during the operation of an exhaust brake for the engine 1 is defined as a function of the generator rotating speed ωc.

When the exhaust-valve operation signal Bs, which is calculated by the exhaust-brake determination unit 7d_6 in the exhaust-valve operation control unit 7d in the power-generation control unit 7, is OFF, then the torque corrector 7b_3 selects the friction-torque command characteristic Teb_chara1 and outputs the torque correction value Tc_ref2 on the basis of the friction-torque command characteristic Teb_chara1. Further, when the generator rotating speed ωc increases and an ON signal as an exhaust-valve operation signal Bs is output, then the torque corrector 7b_3 selects the friction-torque command characteristic Teb_chara2 and outputs the torque correction value Tc_ref2 on the basis of the selected friction-torque command characteristic Teb_chara2. The switching between an engine brake and an exhaust brake is performed in accordance with an ON/OFF signal output as the exhaust-valve operation signal Bs.

Next, a method of setting a parameter value that is defined in the map of the torque corrector 7b_3 will be described in detail with reference to FIG. 8.

First, with the method of setting a lower-limit value, a lower-limit value X0 of the generator rotational speed ωc illustrated by a dot-and-dash line is set such that the generator rotating speed ωc corresponds to the idling rotating speed ωe_idol of the engine 1; and the torque correction value Tc_ref2 is set lower for the engine brake than that for the exhaust brake.

Furthermore, an upper-limit value is provided with a margin to the allowable maximum rotating speed ωe_lim that is a limit value in a design process when the engine brake and the exhaust brake are applied in the engine 1. Therefore, the upper-limit value is set to a value (Y0) slightly smaller than this allowable maximum rotating speed ωe_lim. This upper-limit set value Y0 for the engine brake and the exhaust brake is set lower than the allowable maximum rotating speed ωe_lim so as to become, for example, 0.9 times as high as the allowable maximum rotating speed.

Note that, due to protection of the engine 1, it is preferable to set the upper-limit value such that a generator torque Tc_ref2 becomes equal to 0 in an area where the generator rotating speed ωc is equal to or higher than the allowable maximum rotating speed ωe_lim.

As described above, in the control device for use in a hybrid vehicle according to the second embodiment, the exhaust-valve operation signal Bs is generated on the basis of the overvoltage threshold value Vdc_lim from the DC-voltage command-value generator 7a_1. This can effectively simplify the control sequence for using the engine brake or the exhaust brake.

The voltage control unit 7c executes a PWM control on an output of the converter 3 on the basis of the torque command value Tc_ref1, output through the PI controller 7b_2 by using the speed command value ωc_ref2 that is input through the speed limiter 7b_1, and on the basis of the torque correction value Tc_ref2, output from the torque corrector 7b_3. Therefore, the torque correction value Tc_ref2 from the torque corrector 7b_3 acts as a feed-forward function to a response delay of the voltage PI controller 7a_2, which is caused when the DC voltage Vdc is changed. Accordingly, regenerated power from the load device 4 can be quickly and effectively consumed.

In the torque corrector 7b_3 there is a plurality of torque command characteristics each based on the presence or absence of the exhaust-valve operation command Bs, and it is preferable that the friction-torque command characteristic Teb_chara1 at the time of operating an engine brake and the friction-torque command characteristic Teb_chara2 at the time of operating an exhaust brake are separately defined for each function for the generator rotating speed ωc. The torque corrector 7b_3 has these two friction-torque command characteristics; therefore, when the exhaust-valve operation command Bs is output to the torque corrector 7b_3 in the speed control unit 7b, the friction-torque command characteristic Teb_chara2 is selected from the friction-torque command characteristic Teb_chara1, and the torque correction value Tc_ref2 is output on the basis of the selected friction-torque command characteristic Teb_chara2. Accordingly, the torque correction value Tc_ref2 acts as a feed-forward function more significantly than when the engine brake alone is used, and thus the regenerated power from the load device 4 can be effectively consumed with a quicker response.

In the speed area of the engine 1, which is equal to or higher than the allowable maxim rotating speed ωe_lim, it is preferable that the torque correction value Tc_ref2, output from the torque corrector 7b_3, is set to be zero. With the setting described above, even when the rotating speed ωc of the generator 2 is increased rapidly, the torque correction value Tc_ref2 from the torque corrector 7b_3 is still equal to zero, so the control operation by the power-generation control unit 7 becomes effectively stable.

Third Embodiment

Figure 9:
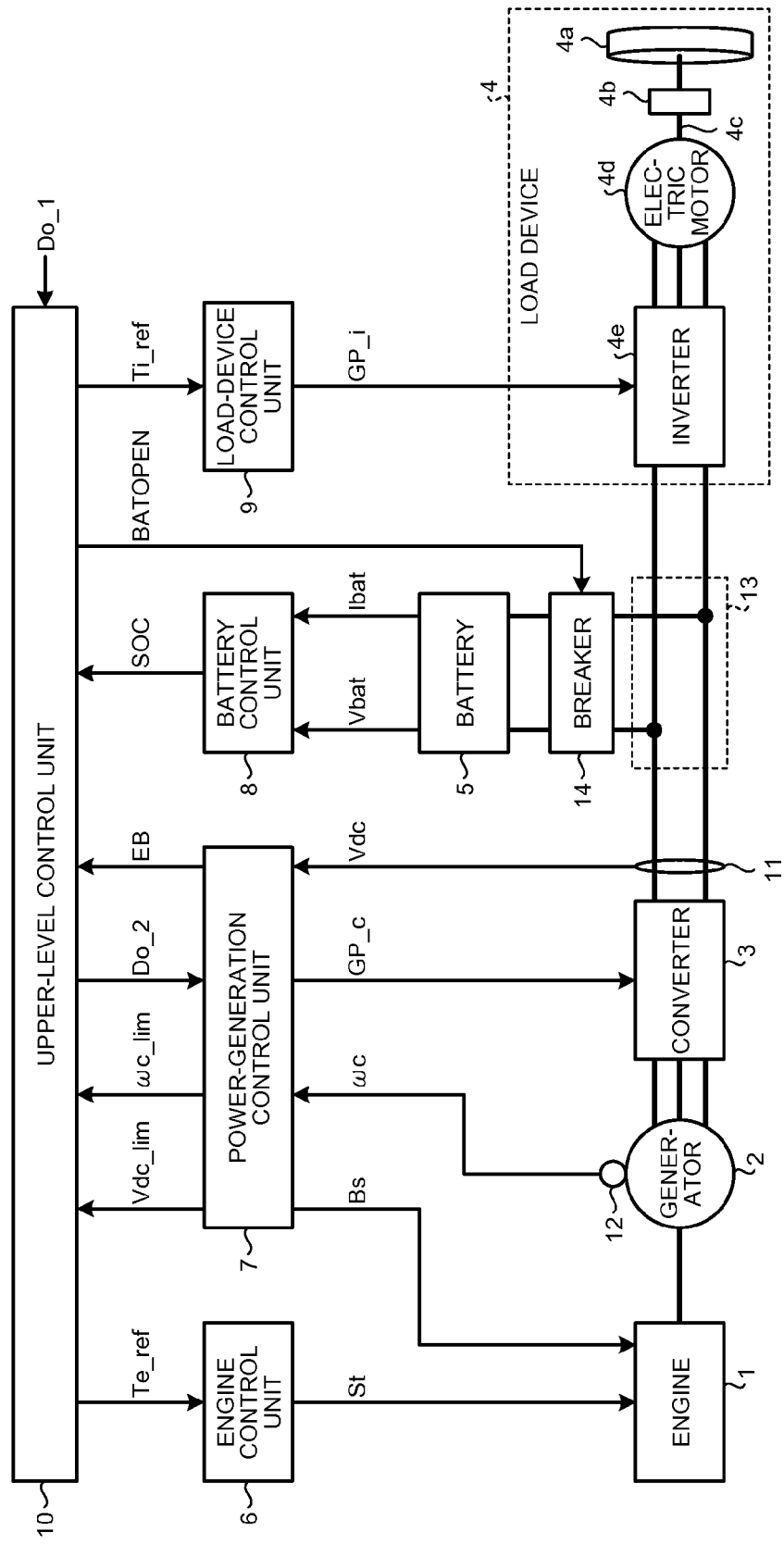
FIG. 9 is a block diagram illustrating an overall configuration of a hybrid vehicle system including a control device for use in a hybrid vehicle according to the third embodiment of the present invention.

Next, a control device for use in a hybrid vehicle according to a third embodiment of the present invention will be described. FIG. 9 is a block diagram illustrating the overall configuration of a hybrid vehicle system including a control device for use in a hybrid vehicle according to the third embodiment of the present invention. The system control unit in the third embodiment differs when compared with that in the first embodiment in that a breaker 14 is provided between the battery 5, the converter 3, and the inverter 4e of the load device 4; and that a battery-open control signal line is connected from the upper-level control unit 10 to the battery 5.

The power-generation control unit 7 used in the third embodiment can be the power-generation control unit 7 used in either the first embodiment or in the second embodiment. The power-generation control unit 7 in both the first embodiment and the second embodiment is configured to output the generator limit signal ωc_lim from the speed limiter 7b_1 to the upper-level control unit 10. The upper-level control unit 10 monitors the generator limit signal ωc_lim. When the generator limit signal ωc_lim becomes equal to or greater than an allowable value, the upper-level control unit 10 outputs a battery-open signal BATOPEN to the breaker 14 so as to control the battery 5 such that it is open. Due to this control, a regenerated current does not flow into the battery 5, and regenerated power from the load device 4 can be blocked. Therefore, overvoltage to the battery 5 and an excessive temperature increase in the battery 5 are effectively prevented.

The configurations described in the first to third embodiments are only examples of the configuration of the present invention. These configurations can be combined with other well-known techniques, and it is not necessary to say that the present invention can be configured while modifying the configurations without departing from the scope of the invention, such as omitting a part of these configurations.

INDUSTRIAL APPLICABILITY

As described above, the present invention is useful as a control device for use in a hybrid vehicle that can prevent a power storage device from being overcharged and from reaching overvoltage.

REFERENCE SIGNS LIST 1 engine, 2 generator, 3 converter, 4 load device, 4a drive wheel, 4b axle, 4c speed reducer, 4d electric motor, 4e inverter, 5 battery, 6 engine control unit, 7 power-generation control unit, 7a rotational-speed command-value generation unit, 7a_1 DC-voltage command-value generator, 7a_2 voltage PI controller, 7b speed control unit, 7b_1 speed limiter, 7b_2 speed PI controller, 7b_3 torque corrector, 7c voltage control unit, 7d exhaust-valve operation control unit, 7d_1 comparator, 7d_2 comparator, 7d_3 comparator, 7d_4 acceleration/coasting/regeneration determination unit, 7d_5 engine-brake determination unit, 7d_6 exhaust-brake determination unit, 8 battery control unit, 9 load-device control unit, 10 upper-level control unit, 11 voltage sensor, 12 speed sensor, 13 DC link portion, 14 breaker.

The invention claimed is:

1. A control device for use in a hybrid vehicle that is applied to a hybrid vehicle that includes
a generator that is driven by an engine,
a converter that converts AC power output by the generator to DC power,
a power storage device that is electrically connected to the converter, and
a load device that is driven by using at least one of electric power output by the converter and electric power from the power storage device and that performs a regenerative operation,
the control device for use in a hybrid vehicle comprising:
a power-generation control unit that controls, by controlling the converter, an amount of power generated by the generator;
an upper-level control unit that controls at least an operation of the power-generation control unit, wherein
the power-generation control unit includes an overvoltage prevention unit that
calculates a rotational-speed command value for the generator by using information on a differential voltage value between a DC-voltage command value that is set within a range, where it does not exceed an overvoltage threshold value that is equal to or lower than a fully-charged voltage value, for an electrical connection end of the power storage device and a DC voltage of the electrical connection end, and that executes a PWM control on an output of the converter, by setting the differential voltage value as the rotational-speed command value when the DC voltage becomes equal to or higher than the overvoltage threshold value, such that a rotational speed of the generator follows the rotational-speed command value and therefore the DC voltage follows the DC-voltage command value, and
when the DC voltage becomes equal to or higher than the overvoltage threshold value during a regenerative operation in the load device and when a rotational speed of the generator becomes equal to or higher than an idling rotating speed, the upper-level control unit outputs an engine torque command that is equal to zero in order to prompt the engine to operate an engine brake.

2. The control device for use in a hybrid vehicle according to claim 1, wherein
the overvoltage prevention unit includes
a rotational-speed command-value calculation unit that calculates the rotational-speed command value by using the DC-voltage command value and the DC voltage,
a speed control unit that generates a torque command value for the generator on the basis of a differential value between the rotational-speed command value and a rotational speed of the generator, and
a voltage control unit that executes a PWM control on the converter on the basis of the torque command value.

3. The control device for use in a hybrid vehicle according to claim 2, wherein
the rotational-speed command-value calculation unit includes
a DC-voltage command generator that generates the DC-voltage command value, and
a voltage PI controller that calculates the rotational-speed command value on the basis of the differential voltage value.

4. The control device for use in a hybrid vehicle according to claim 3, wherein
an overvoltage threshold value, at which the DC-voltage command value starts being limited, is set in the DC-voltage command generator.

5. The control device for use in a hybrid vehicle according to claim 4, wherein
the overvoltage threshold value is set in consideration of a voltage fluctuation range that is estimated in advance on the basis of an internal resistance of the power storage device and a maximum absorbed current of the power storage device.

6. The control device for use in a hybrid vehicle according to claim 2, wherein
the speed control unit includes
a speed limiter that limits at least one of a lower-limit value and an upper-limit value of the rotational-speed command value, and
a speed PI controller that calculates the torque command value on the basis of a rotational-speed command value that is input via the speed limiter.

7. The control device for use in a hybrid vehicle according to claim 6, wherein
the lower-limit value of the rotational-speed command value in the speed limiter is set equal to or higher than an idling rotating speed of the engine.

8. The control device for use in a hybrid vehicle according to claim 6, wherein
the upper-limit value of the rotational-speed command value in the speed limiter is set equal to or lower than an allowable rotating speed when an engine brake operates.

9. The control device for use in a hybrid vehicle according to claim 6, wherein
limit processing information in the speed limiter is transmitted to the upper-level control unit.

10. The control device for use in a hybrid vehicle according to claim 9, wherein
the upper-level control unit adjusts regenerated power to be generated by a load device on the basis of the limit processing information.

11. The control device for use in a hybrid vehicle according to claim 9, wherein
the upper-level control unit outputs a signal that makes an electrical connection end open between the power storage device and the converter on the basis of the limit processing information in the speed limiter.

12. The control device for use in a hybrid vehicle according to claim 6, wherein
the power-generation control unit further includes an exhaust-valve operation control unit that outputs an exhaust-valve operation command for the engine on the basis of the DC voltage, a rotational speed of the generator, and the overvoltage threshold value.

13. The control device for use in a hybrid vehicle according to claim 6, further comprising
a torque corrector that
includes a torque command characteristic of the engine, and
outputs a torque correction value on the basis of a rotational speed of the generator, wherein
the voltage control unit executes a PWM control on an output of the converter on the basis of the rotational-speed command value that is input via the speed limiter and on the basis of the torque correction value that is output from the torque corrector.

14. The control device for use in a hybrid vehicle according to claim 12, further comprising
a torque corrector that
includes a plurality of torque command characteristics, each according to the presence or absence of the exhaust-valve operation command,
selects one of the torque command characteristics on the basis of an exhaust valve operation in the engine, and
outputs a torque correction value on the basis of this selected torque command characteristic, wherein
the voltage control unit executes a PWM control on an output of the converter on the basis of the rotational-speed command value that is input via the speed limiter and on the basis of the torque correction value that is output from the torque corrector.

15. The control device for use in a hybrid vehicle according to claim 13, wherein
a torque correction value to be output from the torque corrector is set to zero in a speed area that is equal to or higher than an allowable maximum rotating speed of the engine.

* * * * *